United States Patent
Kim et al.

(10) Patent No.: US 10,952,251 B2
(45) Date of Patent: Mar. 16, 2021

(54) METHOD FOR PERFORMING RANDOM ACCESS PROCEDURE BY TERMINAL IN WIRELESS COMMUNICATION SYSTEM SUPPORTING UNLICENSED BAND AND TERMINAL FOR PERFORMING SAME

(71) Applicant: LG ELECTRONICS INC., Seoul (KR)

(72) Inventors: Seonwook Kim, Seoul (KR); Changhwan Park, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 14 days.

(21) Appl. No.: 16/491,982

(22) PCT Filed: Mar. 12, 2018

(86) PCT No.: PCT/KR2018/002896
§ 371 (c)(1),
(2) Date: Sep. 6, 2019

(87) PCT Pub. No.: WO2018/164553
PCT Pub. Date: Sep. 13, 2018

(65) Prior Publication Data
US 2020/0045735 A1     Feb. 6, 2020

Related U.S. Application Data

(60) Provisional application No. 62/469,524, filed on Mar. 10, 2017.

(51) Int. Cl.
*H04W 74/08*     (2009.01)
*H04W 16/14*     (2009.01)
(Continued)

(52) U.S. Cl.
CPC ....... *H04W 74/0808* (2013.01); *H04W 16/14* (2013.01); *H04W 52/04* (2013.01); *H04W 72/046* (2013.01)

(58) Field of Classification Search
None
See application file for complete search history.

(56) References Cited

U.S. PATENT DOCUMENTS

2018/0035465 A1*   2/2018   Ahn ................. H04W 74/08
2019/0029054 A1*   1/2019   Li .................... H04W 74/006

FOREIGN PATENT DOCUMENTS

| KR | 1020100049487 A | 5/2010 |
| WO | 2013126858 A1 | 8/2013 |
| WO | 2017026798 A1 | 2/2017 |

OTHER PUBLICATIONS

Change Request, Qualcomm Incorporated, "Draft CR on using 25us LBT for UEs on carriers without eNB Cat 4 LBT", 3GPP TSG-RAN Meeting #87, Nov. 10-14, 2016, R1-1611584.

(Continued)

*Primary Examiner* — Anh Ngoc M Nguyen
(74) *Attorney, Agent, or Firm* — Dentons US LLP

(57) ABSTRACT

The present invention provides a method for performing a random access procedure by a terminal in a wireless communication system supporting an unlicensed band and a terminal for performing the same. Particularly, the present invention provides a method for, when a terminal and a base station can transmit or receive a signal using various beam resources, performing a random access procedure for the base station by the terminal via an unlicensed band, and the terminal for performing the same.

14 Claims, 16 Drawing Sheets

(51) Int. Cl.
*H04W 52/04* (2009.01)
*H04W 72/04* (2009.01)

(56) References Cited

OTHER PUBLICATIONS

Mitsubishi Electric, "RACH preamble transmission and reception", 3GPP TSG-RAN WG1 #87, Nov. 14-18, 2016, R1-1611728.

\* cited by examiner

FIG. 9
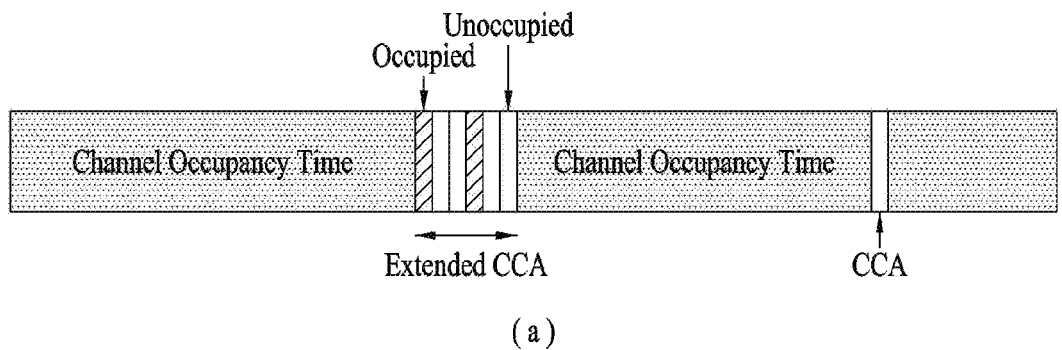
(a)
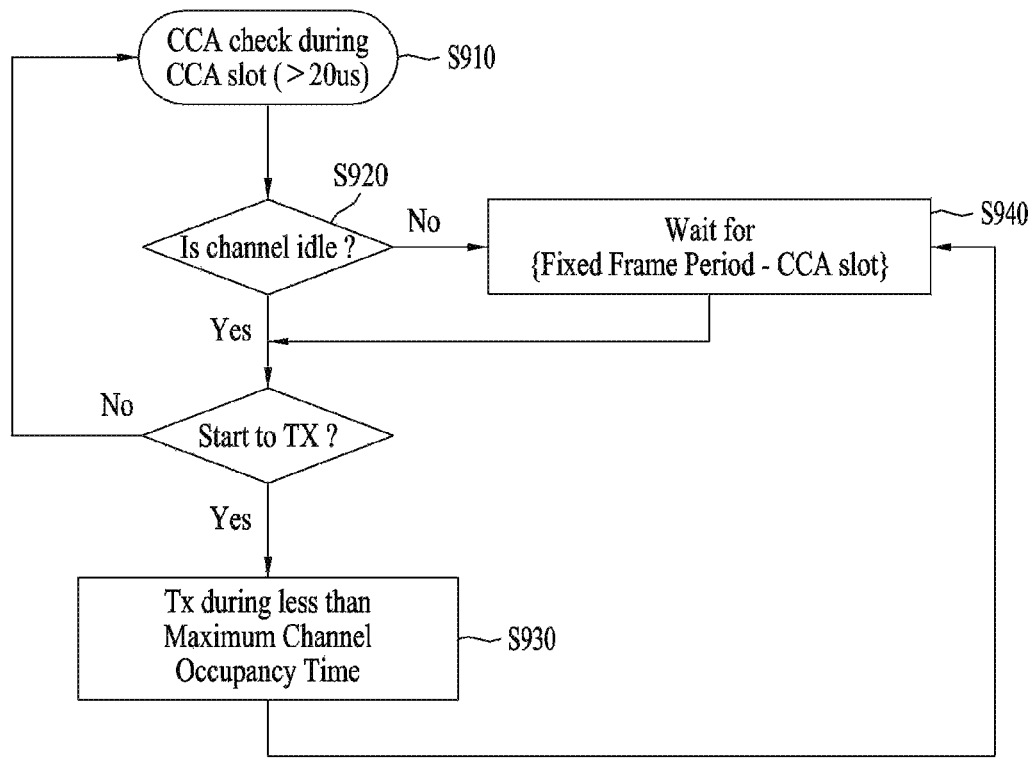
(b)

METHOD FOR PERFORMING RANDOM ACCESS PROCEDURE BY TERMINAL IN WIRELESS COMMUNICATION SYSTEM SUPPORTING UNLICENSED BAND AND TERMINAL FOR PERFORMING SAME

This application is a National Stage Application of International Application No. PCT/KR2018/002896, filed on Mar. 12, 2018, which claims the benefit of U.S. Provisional Application No. 62/469,524, filed on Mar. 10, 2017, all of which are hereby incorporated by reference in their entirety for all purposes as if fully set forth herein.

TECHNICAL FIELD

The present disclosure relates to a wireless communication system, and more particularly, to a method of performing a random access procedure by a terminal in a wireless communication system supporting an unlicensed band and terminal for performing the same.

Particularly, the present disclosure is directed to a method by which a terminal performs a random access procedure to a base station in an unlicensed band when the terminal and the base station are capable of transmitting and receiving signals using various beam resources and terminal for performing the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

The object of the present disclosure is to provide a method by which a terminal (or user equipment) performs a random access procedure to a base station in an unlicensed band when a newly proposed wireless communication system supports the unlicensed band and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method of performing a random access procedure by a user equipment (UE) in a wireless communication system supporting an unlicensed band and UE for performing the same.

In an aspect of the present disclosure, provided herein is a method of performing a random access procedure by a user equipment (UE) in a wireless communication system supporting an unlicensed band. The method may include: performing a first channel access procedure for transmitting a random access channel (RACH) preamble in the unlicensed band during a first time unit; when the first channel access procedure succeeds, transmitting the RACH preamble based on a first configuration during the first time unit; and when the first channel access procedure fails, performing a second channel access procedure for transmitting the RACH preamble in the unlicensed band during a second time unit and transmitting the RACH preamble based on a second configuration during the second time unit depending on whether the second channel access procedure succeeds.

In another aspect of the present disclosure, provided herein is a UE for performing a random access procedure in a wireless communication system supporting an unlicensed band. The UE may include: a transmitter; a receiver; and a processor connected to the transmitter and the receiver. The processor may be configured to perform a first channel access procedure for transmitting a RACH preamble in the unlicensed band during a first time unit; when the first channel access procedure succeeds, transmit the RACH preamble based on a first configuration during the first time unit; and when the first channel access procedure fails, perform a second channel access procedure for transmitting the RACH preamble in the unlicensed band during a second time unit and transmit the RACH preamble based on a second configuration during the second time unit depending on whether the second channel access procedure succeeds.

For example, a first transmission power configuration and a first beam configuration included in the first configuration may be set to be equal to a second transmission power configuration and a second beam configuration included in the second configuration, respectively.

As another example, when a predetermined number or more of channel access procedures including the first channel access procedure fail before the second access procedure is performed, the first beam configuration included in the first configuration may be set to be different from the second beam configuration included in the second configuration.

In this case, the first and second channel access procedures may be performed based on the first and second beam configurations, respectively.

As a further example, the transmission power value in the first transmission power configuration included in the first configuration may be set to be higher than that in the second transmission power configuration included in the second configuration, the energy detection (ED) threshold value in a first ED threshold configuration included in the first configuration may be set to be lower than that in a second ED threshold configuration included in the second configuration, and the number of repetitions in a first RACH repetition configuration included in the first configuration may be set to be lower than that in a second RACH repetition configuration included in the second configuration.

When the first and second time units are included within a channel occupancy time (COT) occupied by a base station (BS), each of the first and second channel access procedures may correspond to a channel access procedure for determining whether a channel is idle during a predetermined time for the unlicensed band.

When the UE succeeds in one of the first and second channel access procedures, the UE may transmit information on a COT occupiable by the UE to the BS.

The first and second time units may be preconfigured by the BS.

The UE may expect to receive a response message for the RACH preamble within a predetermined time window from the time when the RACH preamble is transmitted.

The predetermined time window may be set to be longer than a time window for the RACH preamble configured for a licensed band.

The response message may correspond to a random access response (RAR) message.

In the above-described configurations, the first and second time units may correspond to first and second slots, respectively.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present invention have the following effects.

According to the present disclosure, a UE can transmit a RACH preamble for a random access procedure by performing various channel access procedures (e.g., listen before talk (LBT)) depending on situations.

In particular, a UE can perform not only RACH preamble transmission capable of avoiding collisions with another UE and a BS but also a random access procedure including the RACH preamble transmission in a new wireless communication system supporting a plurality of beam resources;

It will be appreciated by persons skilled in the art that the effects that can be achieved through the embodiments of the present invention are not limited to those described above and other advantageous effects of the present invention will be more clearly understood from the following detailed description. That is, unintended effects according to implementation of the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 9 is a diagram illustrating an exemplary load based equipment (LBE) operation as one of the LBT operations;

BEST MODE

Figure 1:
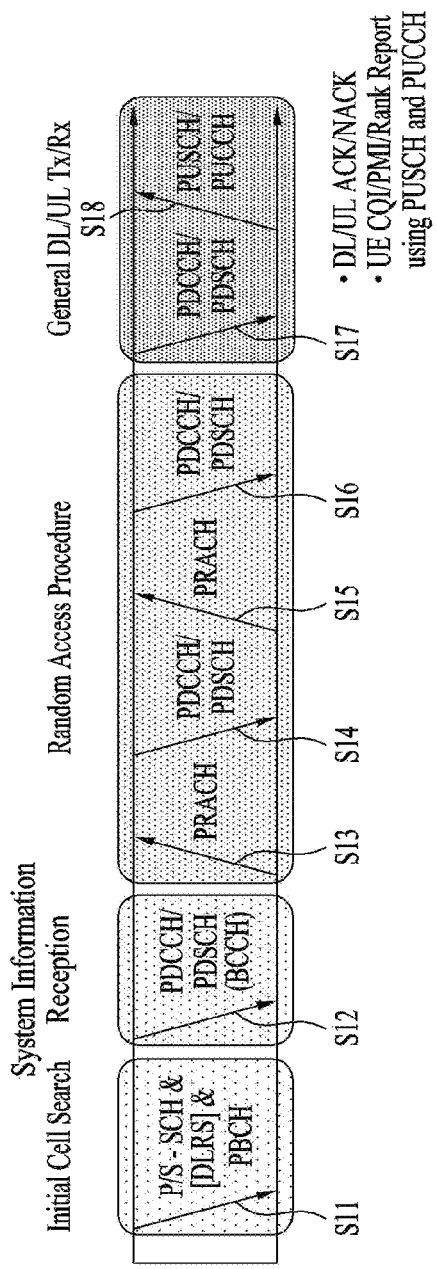
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided least it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

1.1. Physical Channels and Signal Transmission/Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
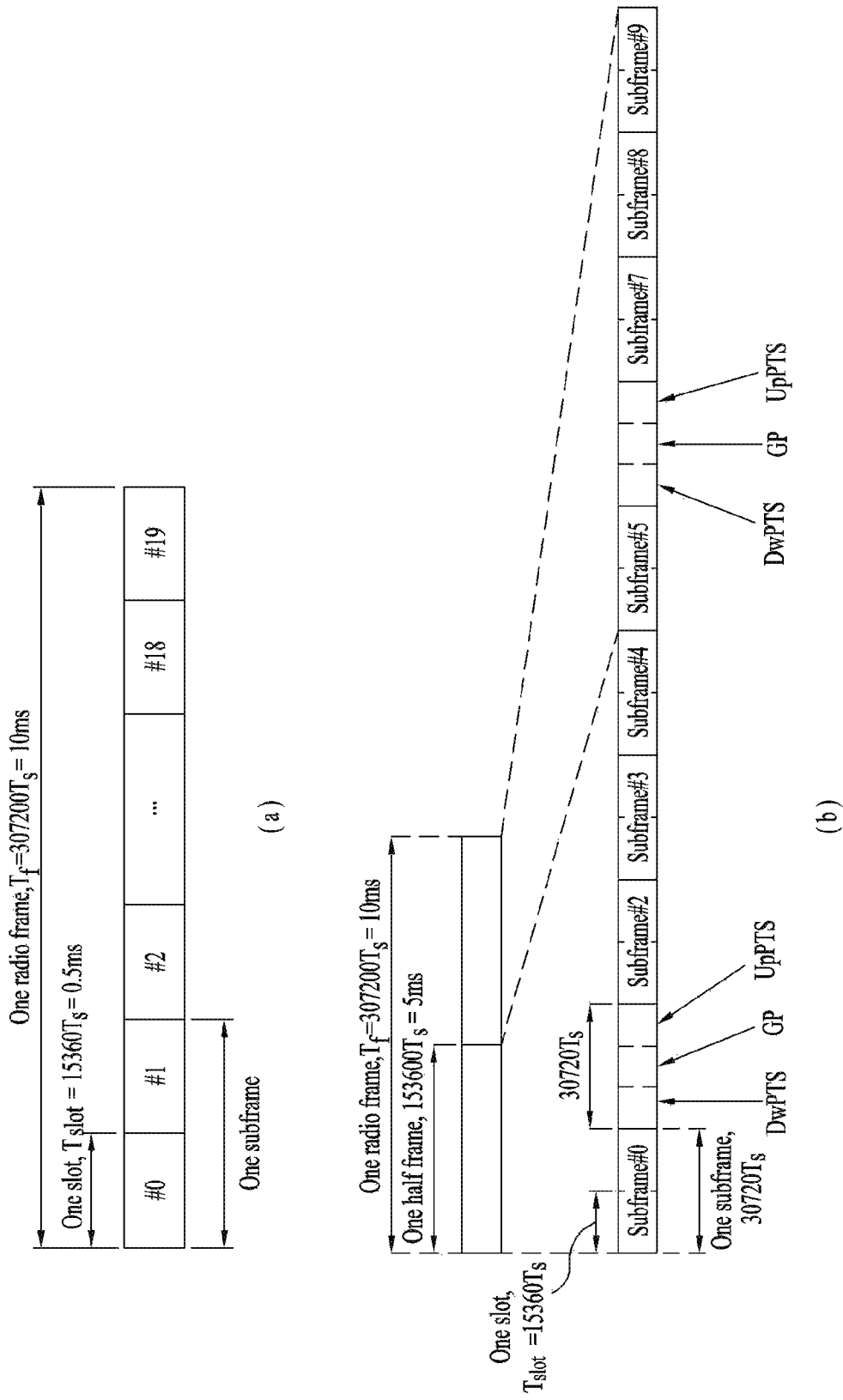
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200 Ts) long, including equal-sized 20 slots indexed from 0 to 19. Each slot is 0.5 ms (Tslot=15360 Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as $Ts=1/(15\ kHz \times 2048)=3.2552 \times 10-8$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as $Ts=1/(15\ kHz \times 2048)=3.2552 \times 10-8$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| | | Normal cyclic prefix in downlink | | Extended cyclic prefix in downlink | | |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
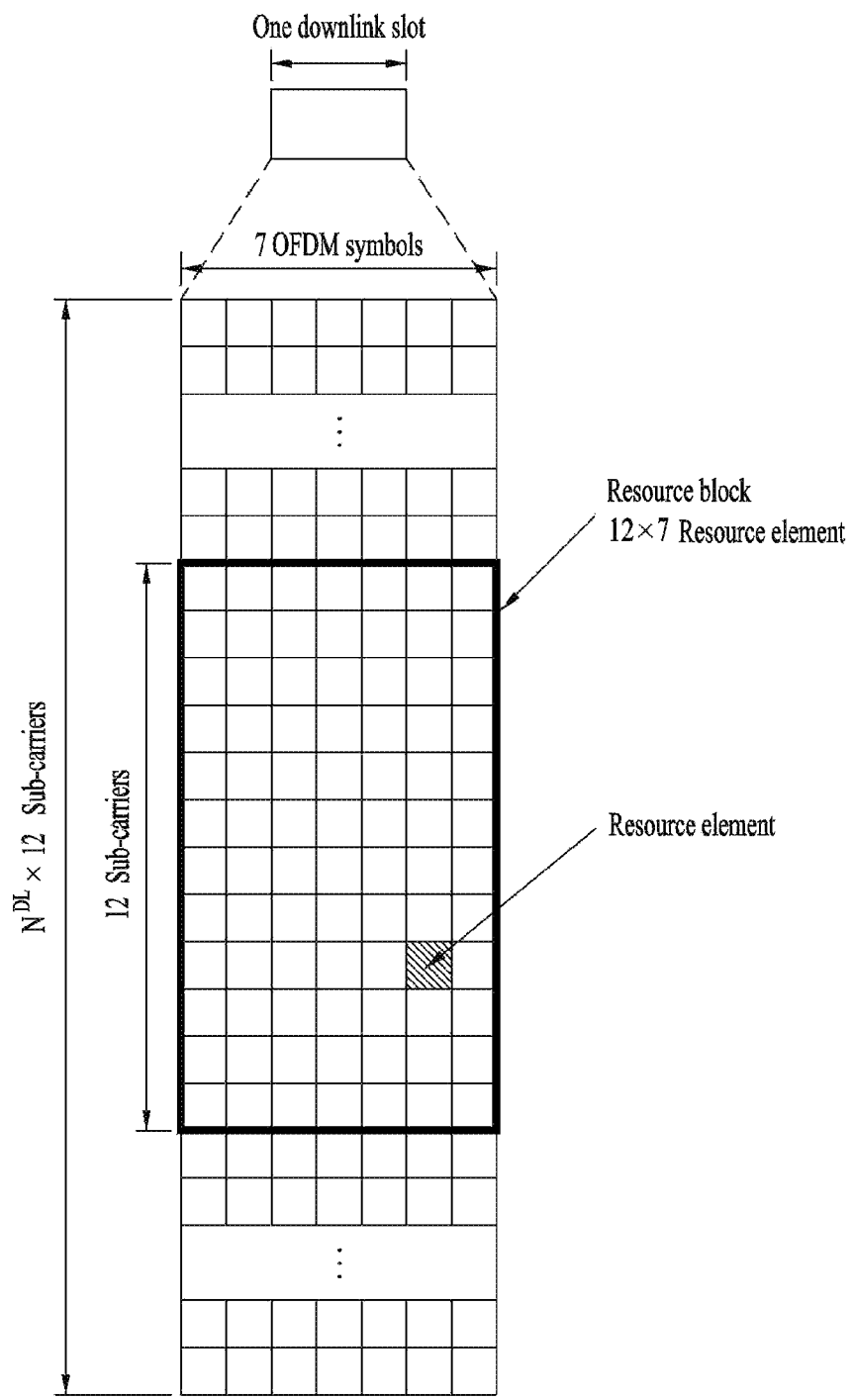
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
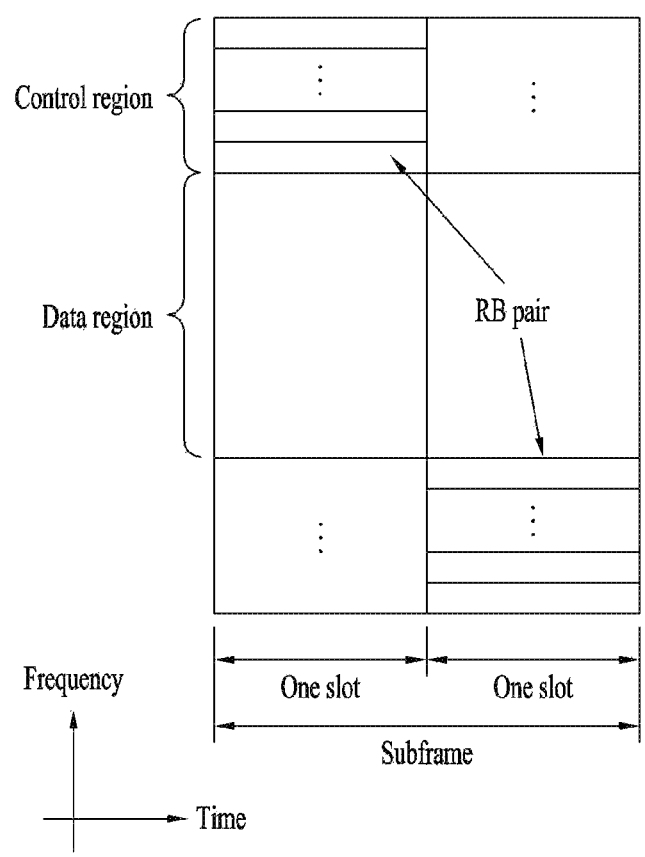
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
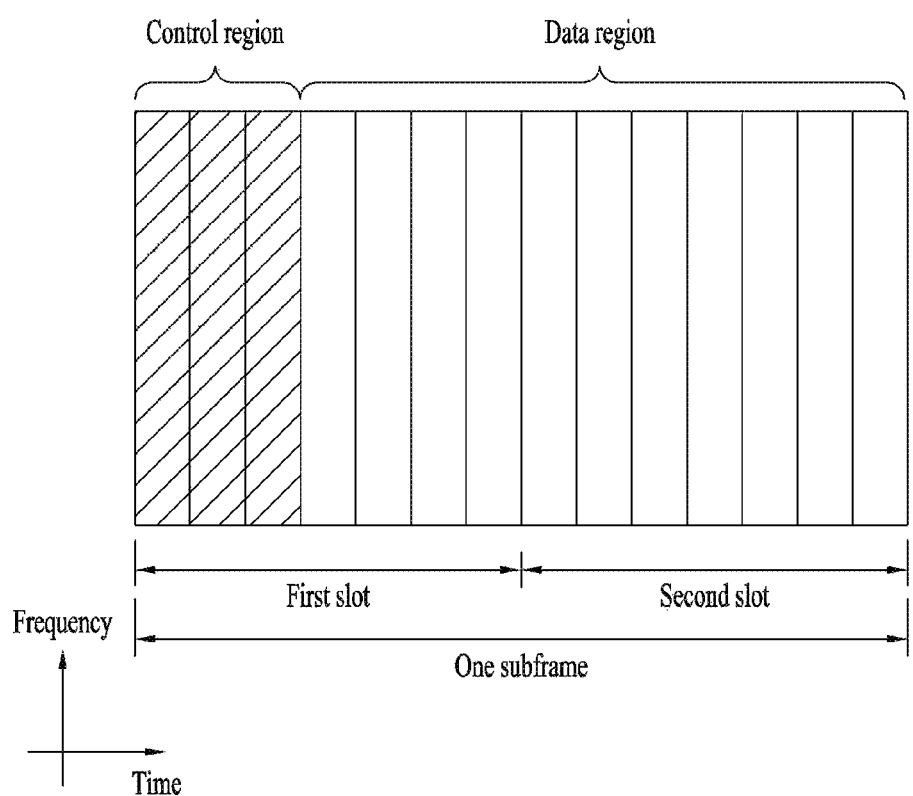
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

1.4. RRM Measurement

LTE systems support radio resource management (RRM) operations including power control, scheduling, cell search, cell reselection, handover, radio link or connection monitoring, and connection establishment/re-establishment. In this operation, a serving cell may make a request to a UE for RRM measurement information, which is a measurement value for performing the RRM operation. As typical information, in an LTE system, a UE may measure information such as cell search information on each cell, reference signal received power (RSRP), and reference signal received quality (RSRQ) and report the same as typical information. Specifically, in the LTE system, the UE may receive measConfig from the serving cell over a higher-layer signal for RRM measurement, and measure the RSRP or RSRQ according to the information of 'measConfig'.

Here, RSRP, RSRQ, and RSSI defined in the LTE system may be defined as follows.

Reference signal received power (RSRP), is defined as the linear average over the power contributions (in [W]) of the resource elements that carry cell-specific reference signals within the considered measurement frequency bandwidth. For example, for RSRP determination, the cell-specific reference signals $R_0$ shall be used. If the UE can reliably detect that $R_1$ is available it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

Reference Signal Received Quality (RSRQ) is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI) comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise, etc. If higher-layer signalling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

Next, Received Signal Strength Indicator (RSSI) is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

In accordance with the definitions above, in the case of intra-frequency measurement, a UE operating in the LTE system may measure RSRP in the bandwidth indicated through the allowed measurement bandwidth-related information element (IE), which is transmitted on system information block type 3, in SIB5. Alternatively, in the case of inter-frequency measurement, the UE may measure RSRP in a bandwidth corresponding to one of 6, 15, 25, 50, 75, and 100 resource blocks (RBs) indicated through the allowed measurement bandwidth transmitted in SIB5. Alternatively, in the case where the IE is absent, the UE may measure RSRP in the frequency band of the entire downlink (DL) system as a default operation.

In this case, if the UE receives the information on the allowed measurement bandwidth, the UE may consider the corresponding value as the maximum measurement bandwidth and freely measure the RSRP value within the range of the corresponding value. However, if the serving cell transmits an IE defined as WB-RSRQ to the UE and the allowed measurement bandwidth is set to 50 RBs or more, the UE shall calculate the RSRP value for the entire allowed measurement bandwidth. In the RSSI measurement, the UE measures RSSI using the frequency band of the receiver of the UE according to the definition of the RSSI bandwidth.

2. LTE-U System

2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
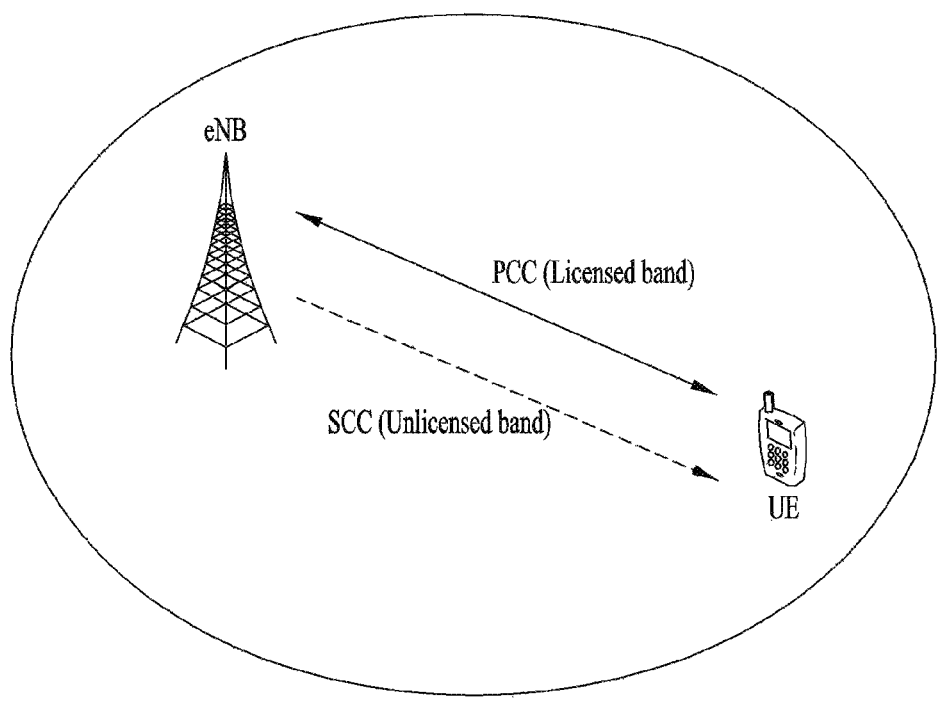
FIG. 6 is a diagram illustrating an exemplary carrier aggregation (CA) environment supported in a long term evolution-unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
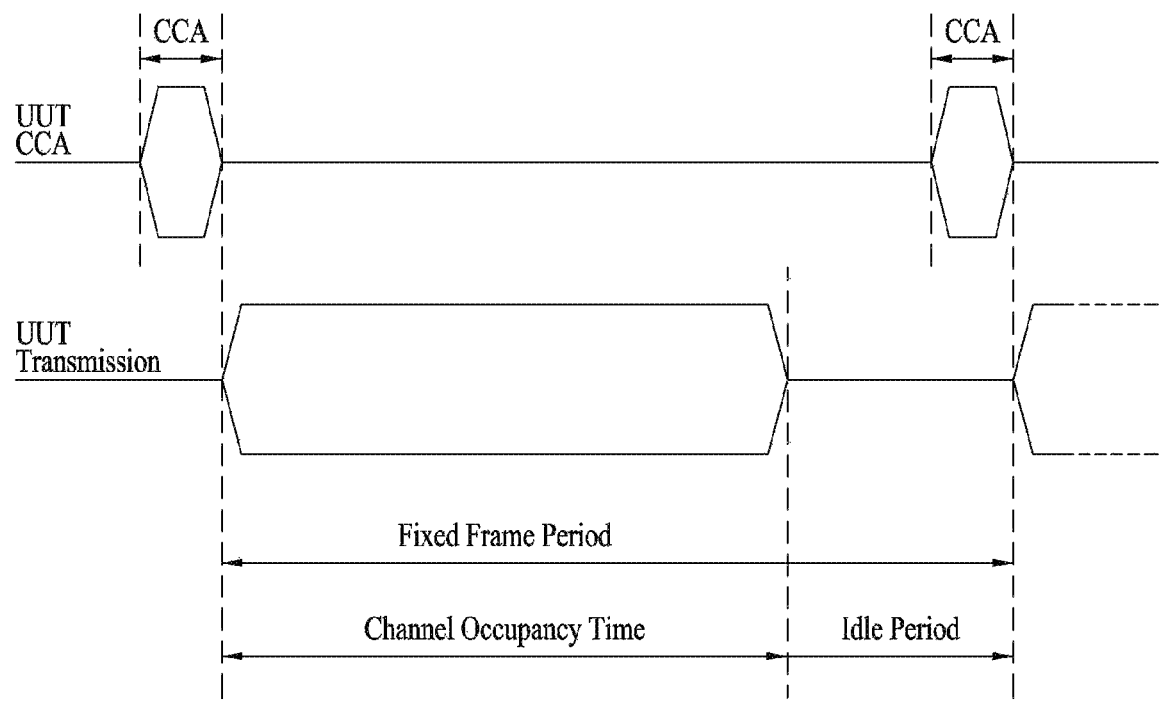
FIG. 7 is a diagram illustrating an exemplary frame based equipment (FBE) operation as one of listen-before-talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
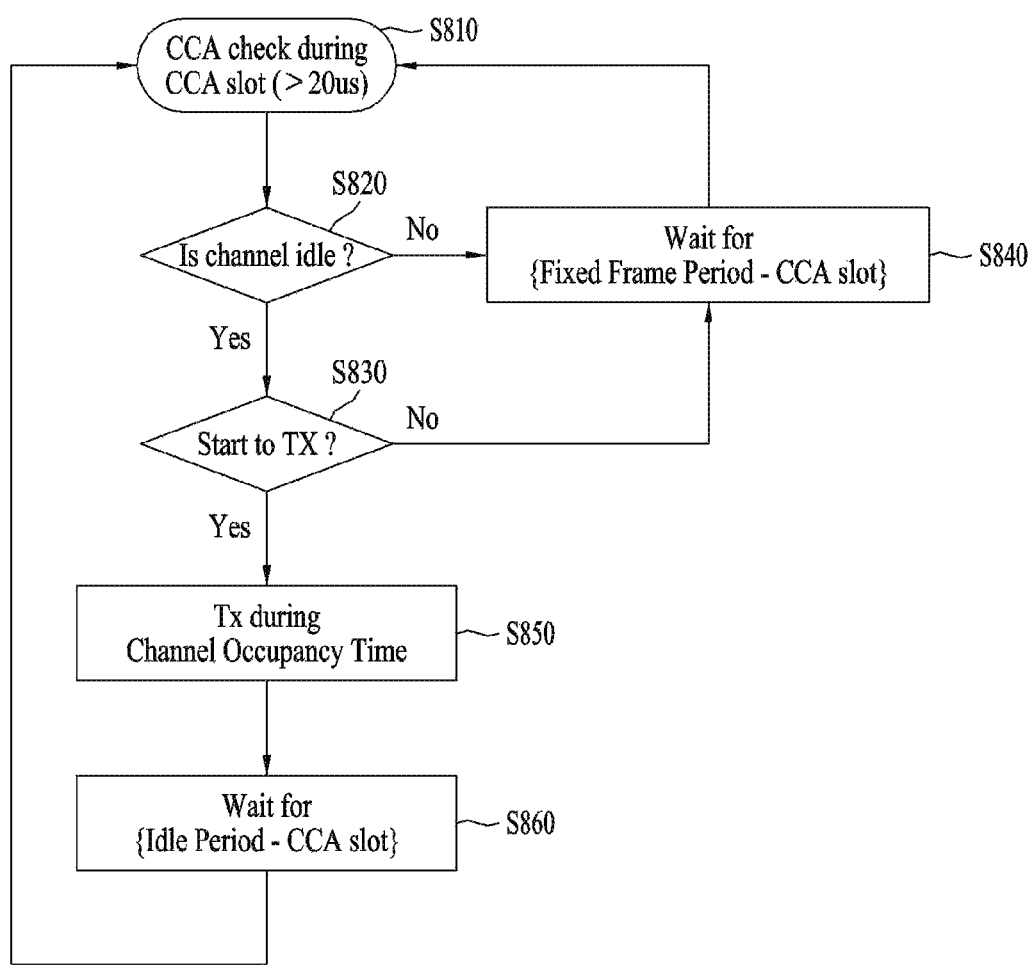
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot [S810]. If the channel is idle [S820], the communication node performs data transmission (Tx) [S830]. If the channel is busy, the communication node waits for a time period calculated by subtracting the CCA slot from a fixed frame period, and then resumes CCA [S840].

The communication node transmits data during the channel occupancy time [S850]. Upon completion of the data transmission, the communication node waits for a time period calculated by subtracting the CCA slot from the idle period [S860], and then resumes CCA [S810]. If the channel is idle but the communication node has no transmission data, the communication node waits for the time period calculated by subtracting the CCA slot from the fixed frame period [S840], and then resumes CCA [S810].

FIG. 9 is a view illustrating an exemplary LBE operation as one of the LBT operations.

Referring to FIG. 9(a), in LBE, the communication node first sets q ($q \in \{4, 5, \ldots, 32\}$) and then performs CCA during one CCA slot.

FIG. 9(b) is a block diagram illustrating the LBE operation. The LBE operation will be described with reference to FIG. 9(b).

The communication node may perform CCA during a CCA slot [S910]. If the channel is unoccupied in a first CCA slot [S920], the communication node may transmit data by securing a time period of up to (13/32)q ms [S930].

On the contrary, if the channel is occupied in the first CCA slot, the communication node selects N ($N \in \{1, 2, \ldots, q\}$) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S940].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
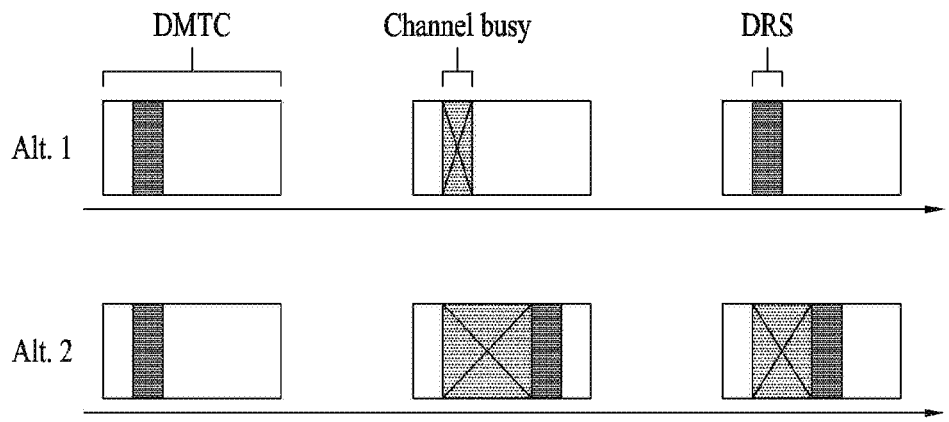
FIG. 10 is a diagram illustrating methods of transmitting a discovery reference signal (DRS) supported in a licensed assisted access (LAA) system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
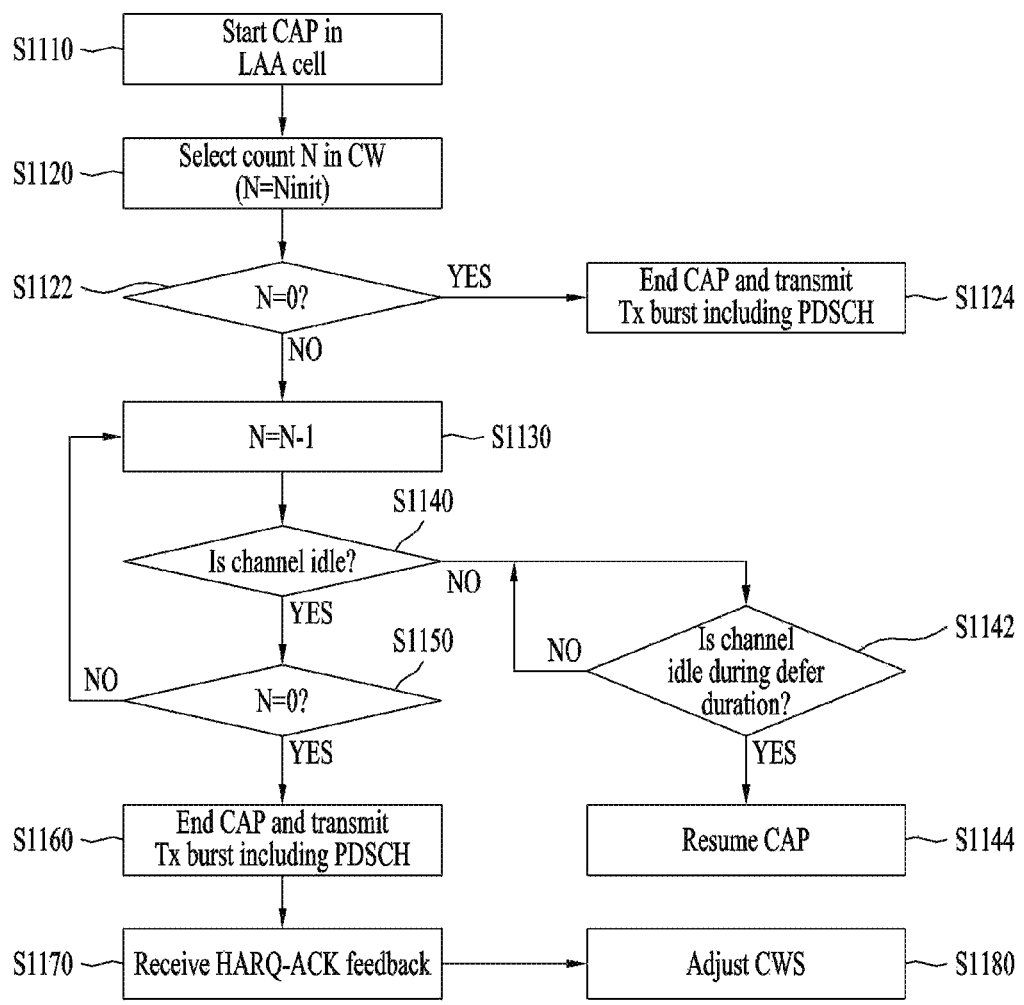
FIG. 11 is a diagram illustrating a channel access procedure (CAP) and contention window adjustment (CWA)

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

2.6. Channel Access Priory Class

TABLE 2

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

2.7. Subframe Structure Applicable to LAA System

Figure 12:
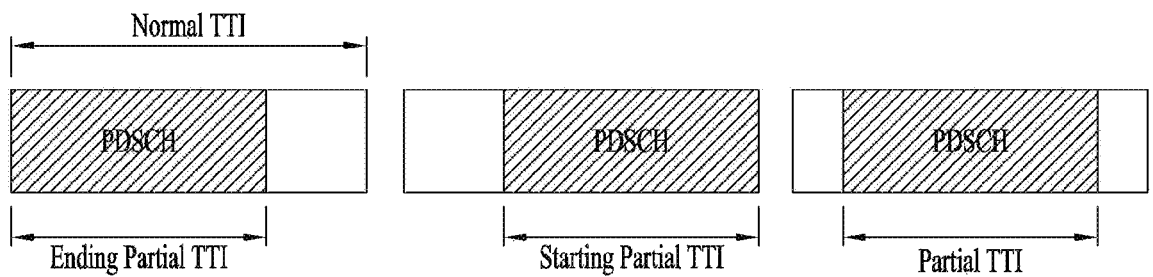
FIG. 12 is a diagram illustrating a partial transmission time interval (TTI) or a partial subframe, which is applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

3. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

3.1. Numerologies

The NR system to which the present invention is applicable supports various OFDM numerologies shown in the following table. In this case, the value of p and cyclic prefix information per carrier bandwidth part can be signaled in DL and UL, respectively. For example, the value of p and cyclic prefix information per downlink carrier bandwidth part may be signaled though DL-BWP-mu and DL-MWP-cp corresponding to higher layer signaling. As another example, the value of p and cyclic prefix information per uplink carrier bandwidth part may be signaled though UL-BWP-mu and UL-MWP-cp corresponding to higher layer signaling.

TABLE 3

| $\mu$ | $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

3.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing p, slots may be numbered within one subframe in ascending order like $n_s^{\mu} \in \{0, \ldots, N_{slot}^{subframe,\mu}-1\}$ slot and may also be numbered within a frame in ascending order like $n_{s,f}^{\mu} \in \{0, \ldots, N_{slot}^{frame,\mu}-1\}$. In this case, the number of consecutive OFDM symbols in one slot ($N_{symb}^{slot}$) may be determined as shown in the following table according to the cyclic prefix. The start slot ($n_s^{\mu}$) of one subframe is aligned with the start OFDM symbol ($n_s^{\mu} N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

In the NR system to which the present invention can be applied, a self-contained slot structure can be applied based on the above-described slot structure.

Figure 13:
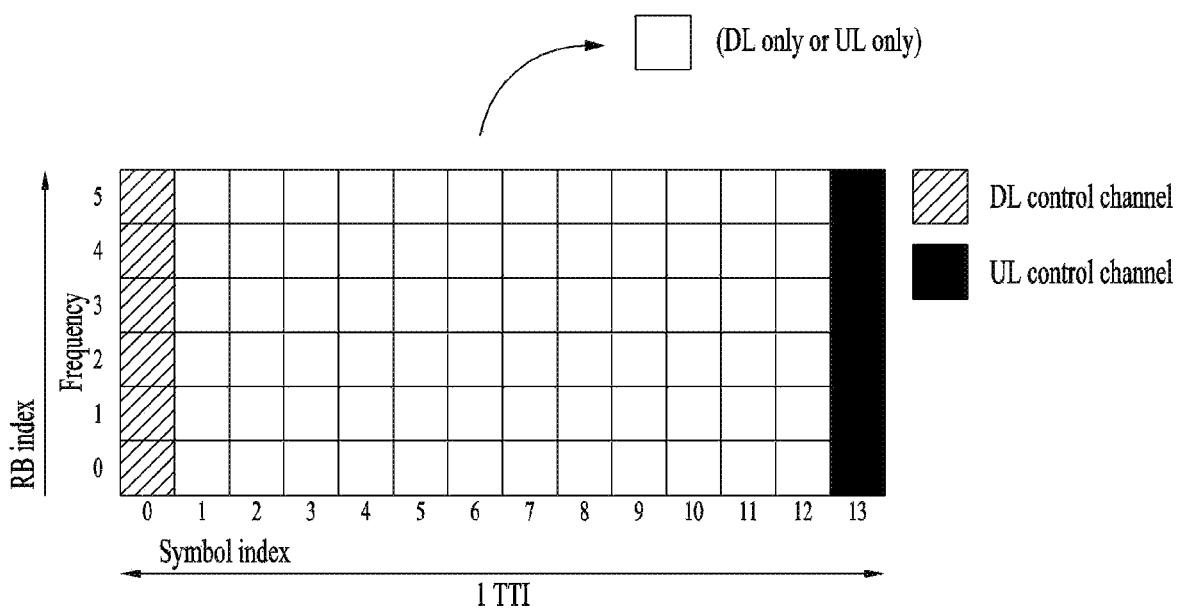
FIG. 13 is a diagram illustrating a self-contained subframe structure applicable to the present invention.

FIG. 13 is a diagram illustrating a self-contained slot structure applicable to the present invention.

In FIG. 13, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the base station and UE can sequentially perform DL transmission and UL transmission in one slot. That is, the base station and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the base station and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 13.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

3.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 14:
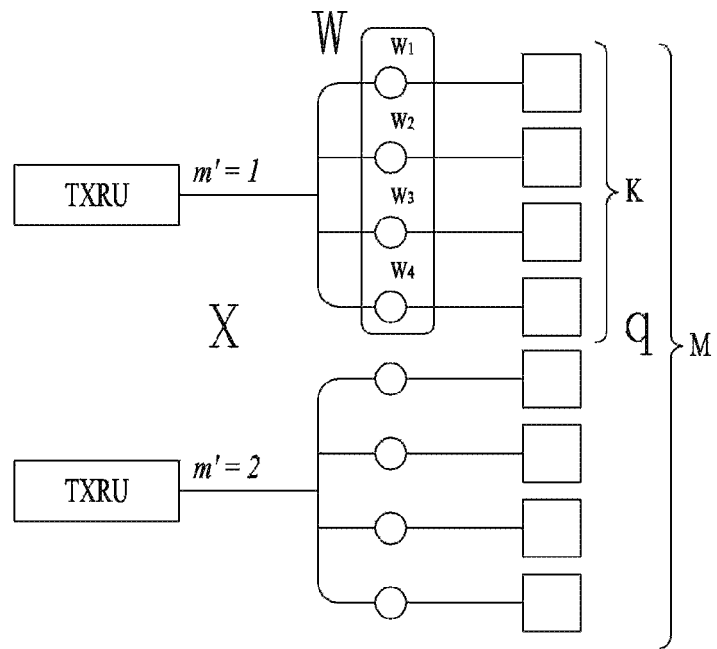
FIGS. 14 and 15 are diagrams illustrating representative methods for connecting TXRUs to antenna elements.
Figure 15:
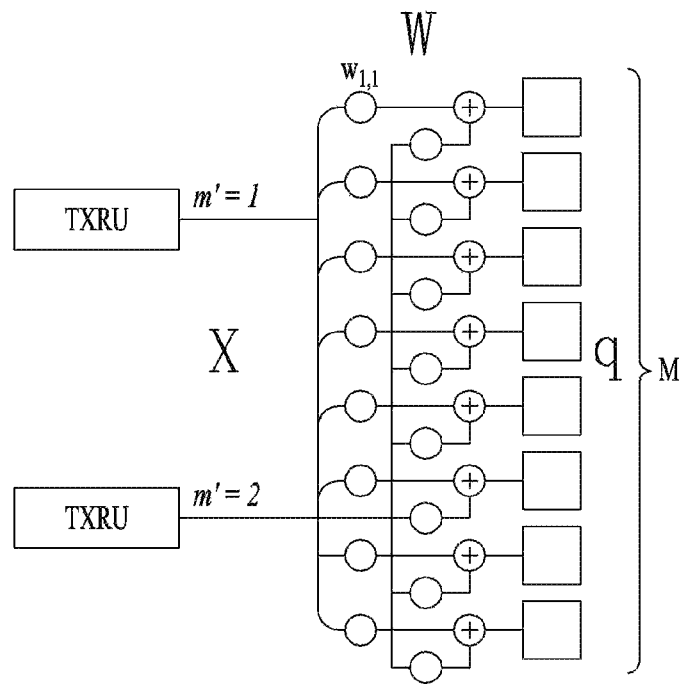

FIGS. 14 and 15 are diagrams illustrating representative methods for connecting TXRUs to antenna elements. Here, the TXRU virtualization model represents the relationship between TXRU output signals and antenna element output signals.

FIG. 14 shows a method for connecting TXRUs to sub-arrays. In FIG. 14, one antenna element is connected to one TXRU.

Meanwhile, FIG. 15 shows a method for connecting all TXRUs to all antenna elements. In FIG. 15, all antenna element are connected to all TXRUs. In this case, separate addition units are required to connect all antenna elements to all TXRUs as shown in FIG. 15.

In FIGS. 14 and 15, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 14 has a disadvantage in that it is difficult to achieve beamforming focusing but has an advantage in that all antennas can be configured at low cost.

On the contrary, the configuration shown in FIG. 15 is advantageous in that beamforming focusing can be easily achieved. However, since all antenna elements are connected to the TXRU, it has a disadvantage of high cost.

When a plurality of antennas is used in the NR system to which the present invention is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 16:
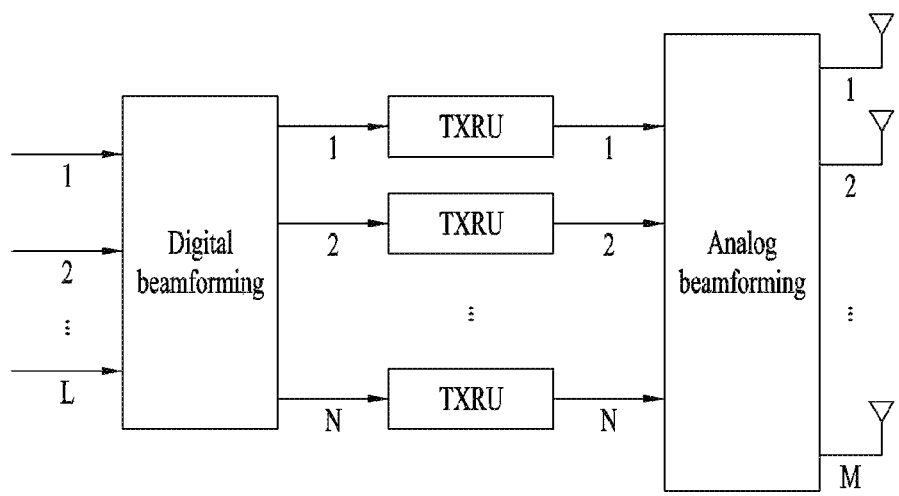
FIG. 16 is a diagram schematically illustrating a hybrid beamforming structure in terms of TXRU and physical antennas according to an embodiment of the present invention.

FIG. 16 is a diagram schematically illustrating an exemplary hybrid BF structure from the perspective of TXRUs and physical antennas according to the present invention. In FIG. 16, the number of digital beams is L and the number analog beams is N.

Additionally, in the NR system to which the present invention is applicable, an base station designs analog BF to be changed in units of symbols to provide more efficient BF support to a UE located in a specific area. Furthermore, as illustrated in FIG. 16, when N specific TXRUs and M RF antennas are defined as one antenna panel, the NR system according to the present invention considers introducing a plurality of antenna panels to which independent hybrid BF is applicable.

In the case in which the base station utilizes a plurality of analog beams as described above, the analog beams advantageous for signal reception may differ according to a UE. Therefore, in the NR system to which the present invention is applicable, a beam sweeping operation is being considered in which the base station transmits signals (at least synchronization signals, system information, paging, and the like) by applying different analog beams in a specific subframe (SF) on a symbol-by-symbol basis so that all UEs may have reception opportunities.

Figure 17:
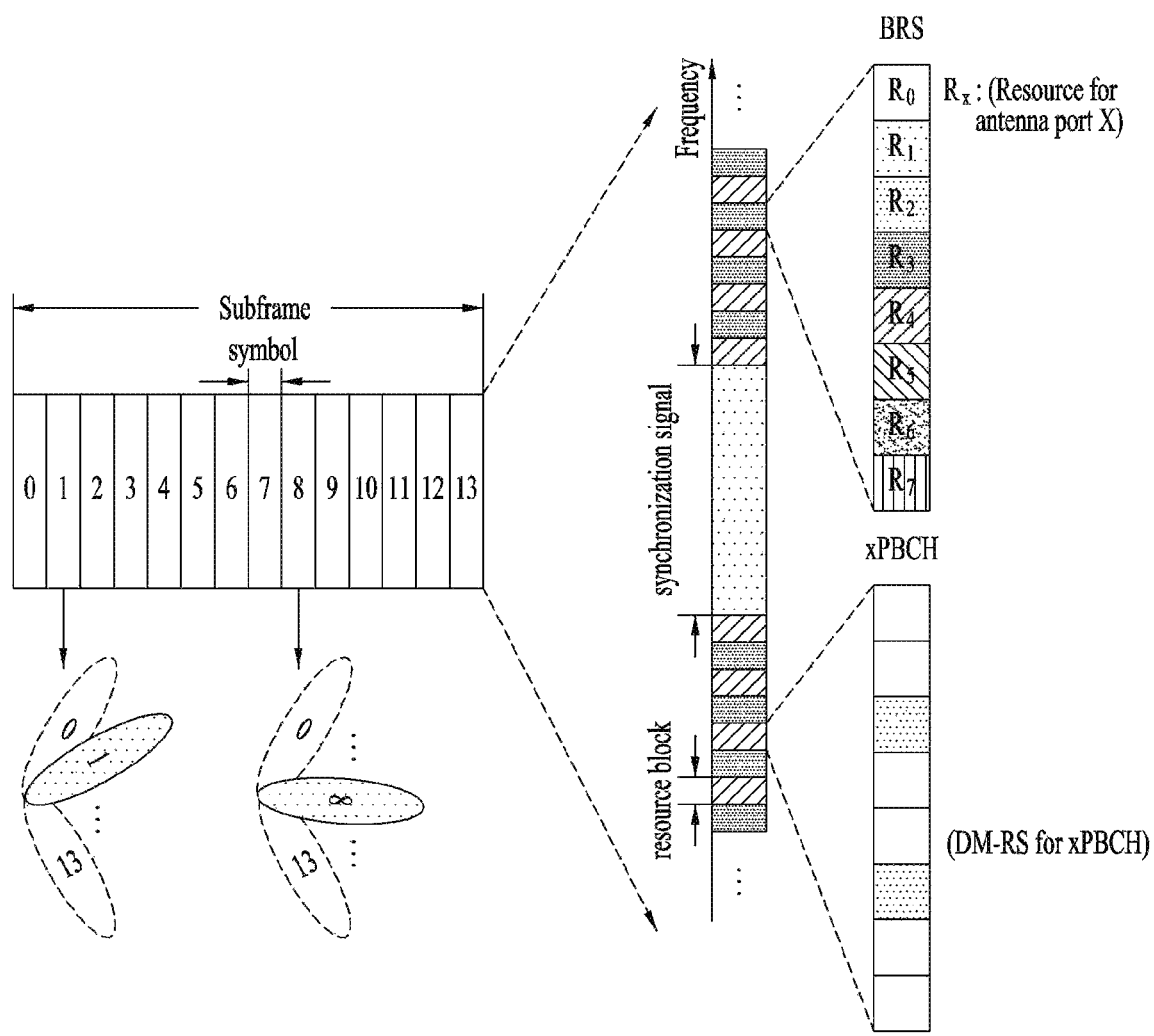
FIG. 17 is a diagram schematically illustrating a beam sweeping operation for a synchronization signal and system information in a downlink (DL) transmission operation according to an embodiment of the present invention.

FIG. 17 is a diagram schematically illustrating an exemplary beam sweeping operation for a synchronization signal and system information in a DL transmission procedure according to the present invention.

In FIG. 17 below, a physical resource (or physical channel) on which the system information of the NR system to which the present invention is applicable is transmitted in a broadcasting manner is referred to as an xPBCH. Here, analog beams belonging to different antenna panels within one symbol may be simultaneously transmitted.

As illustrated in FIG. 17, in order to measure a channel for each analog beam in the NR system to which the present invention is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

4. Proposed Embodiments

Hereinafter, a description will be given of how a BS and a UE operate in unlicensed bands based on the above-described technical features.

As a number of communication devices have required higher communication capacity, a method of efficiently using limited frequency bands have been considered in wireless communication systems.

In a cellular communication system to which the present disclosure is applicable such as the LTE system, NR system, etc., a method of using unlicensed bands used in the conventional Wi-Fi system such as the 2.4 GHz band or newly proposed unlicensed bands such as the 5 GHz band and the 60 GHz band for traffic offloading has been considered.

Basically, it is assumed that each communication node competes with other communication nodes to perform wireless transmission and reception in unlicensed bands. Thus, before transmitting a signal, each communication node needs to perform channel sensing to check that other communication nodes perform no signal transmission. This operation may be referred to as listen before talk (LBT) or a channel access procedure in an unlicensed band. In addition, an operation in which a specific communication node checks whether other communication nodes perform signal transmission may be referred to as carrier sensing. In this case, if the specific communication node determines that other communication nodes perform no signal transmission, it may be said that clear channel assessment (CCA) is confirmed.

In the LTE/NR system to which the present disclosure is applicable, an eNB (or gNB) or a UE needs to perform LBT to transmit a signal in an unlicensed band (hereinafter referred to as a U-band). In addition, when the eNB (or gNB) or UE performs signal transmission, other communication nodes such as a Wi-Fi node, etc. need to perform the LBT to avoid causing interference to the eNB (or gNB) or UE. For example, in the Wi-Fi specification (e.g., 801.11ac), the CCA threshold is defined as −62 dBm in the case of a non-Wi-Fi signal and as −82 dBm in the case of a Wi-Fi signal. It may mean that if a station (STA) or an access point (AP) receives a non-Wi-Fi signal with power equal to or higher than −62 dBm (or an energy detection threshold), the STA or AP performs no signal transmission to avoid causing interference.

In the NR system to which the present disclosure is applicable, a signal may be beamformed and then transmitted on multiple antennas (in particular, in a millimeter wave (mmWave) band). Specifically, a transmitting end may transmit a signal for (toward) a part of the entire cell coverage in each time unit (e.g., in each slot or symbol) using analog beams. Alternatively, the transmitting end may transmit a omni-directional signal in multiple allocated time units through beam sweeping of the analog beams.

Accordingly, the present disclosure describes a method of transmitting a random access channel (RACH) preamble signal (which may be beamformed for transmission and reception thereof) in U-bands operating based on random access and a RACH procedure that considers LBT operation.

Figure 18:
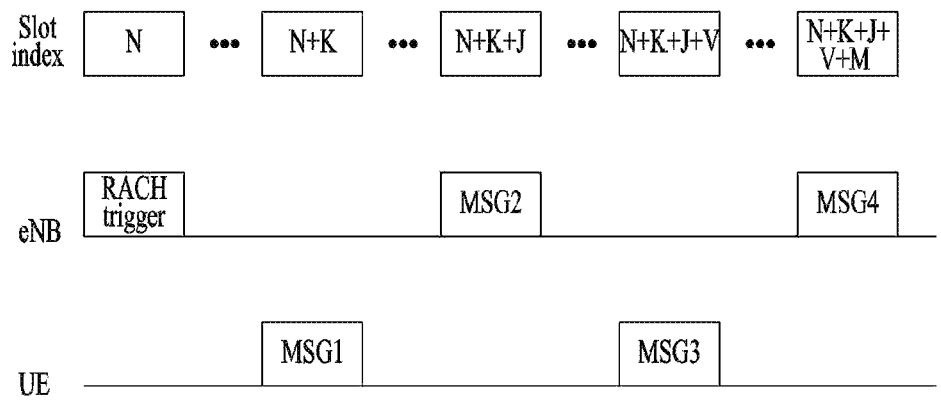
FIG. 18 is a diagram schematically illustrating a random access procedure.

FIG. 18 is a diagram schematically illustrating a RACH procedure.

As shown in FIG. 18, a RACH procedure is performed by handshaking between an eNB and a UE. For example, if an eNB (or gNB) triggers a RACH procedure in slot (or subframe) #N, a UE transmits a RACH preamble (or msg1) after K slots (or subframes). Next, the eNB (or gNB) transmits a random access response (RAR) or msg2 after J slots from the time when the RACH preamble (or msg1) is transmitted, and the UE transmits msg3 on an allocated resource after V slots from the time when the RAR (or msg2) is transmitted. Thereafter, the eNB (or gNB) transmits msg4 after M slots from the time when msg3 is transmitted. In doing so, the eNB (or gNB) and UE may complete the RACH procedure.

In this case, a slot of the NR system may correspond to a subframe of the LTE system.

Although it is assumed in FIG. 18 that each message is transmitted in one slot for convenience of description, each message may be transmitted in a time period shorter or longer than one slot, depending on situations.

In addition, a RACH trigger may correspond to PDCCH order in the legacy LTE system, newly defined cell-common (UE-group common or UE-specific) DCI, or a signal block including a synchronization signal, etc.

The RACH trigger may be omitted (in an initial access procedure).

Alternatively, the RACH procedure may be performed by 2-way handshaking rather than 4-way handshaking.

In FIG. 18, the values of K, J, V, and M may be predefined or indicated by a Layer-1 (L1) message (e.g., DCI) or higher layer signaling (e.g., RRC signaling).

In the following, a method by which a UE transmits a RACH preamble in the case of LBT failure and a method of performing LBT operation for RACH message transmission will be described in detail based on the above technical features.

4.1. RACH Preamble Transmission Method in LBT Failure

The transmission power of a RACH preamble in the legacy LTE system is determined according to Equation 1 below.

$$\text{preambleInitialReceivedTargetPower} + \text{DELTA\_PREAMBLE} + (\text{PREAMBLE\_TRANSMISSION\_COUNTER} - 1) * \text{powerRampingStep} \quad \text{[Equation 1]}$$

That is, the transmission power of the RACH preamble is determined as follows. The transmission power starts from a power value for compensating for a path loss measured based on a cell-specific reference signal (CRS) in addition to preambleInitialReceivedTargetPower, which is configured by higher layer signaling. Then, the transmission power increases as many as the value of powerRampingStep whenever the value of PREAMBLE_TRANSMISSION_COUNTER (referred to as a RACH counter value) increases, where the RACH counter value increases whenever preamble retransmission is performed.

In the NR system to which the present disclosure is applicable, if a UE is capable of transmitting a RACH preamble in multiple beam directions by forming analog beams (in particular, in a mmWave band), the UE may not only change (increase or decrease) transmission power but also change the beam directions of the RACH preamble when retransmitting the RACH preamble.

In particular, considering that a UE is able to perform LBT when transmitting a RACH preamble in a U-band, it needs to be considered that the UE does not attempt to perform RACH preamble transmission due to LBT failure.

To overcome this problem, the present disclosure proposes a method by which a UE transmits a RACH preamble in the above case.

4.1.1. First RACH Preamble Transmission Method

When a UE attempts to transmit a RACH preamble by performing additional LBT since the UE fails to perform LBT for RACH preamble transmission, the UE may perform the additional LBT and the RACH preamble transmission without changing the transmission beam of the RACH preamble and by maintaining the transmission power thereof (or the value of a RACH counter).

This is because since the UE does not attempt the RACH preamble transmission due to the LBT failure, it is desirable that the UE maintains the same beam and power even when the UE attempts the RACH preamble transmission after succeeding in the additional LBT.

In the following description, 'RACH preamble retransmission' may mean that when RACH preamble transmission on a RACH resource configured by a RACH trigger fails, the RACH preamble transmission is performed on a RACH resource configured by a next RACH trigger. In other words, when the UE performs the RACH preamble transmission after the UE fails in the LBT but succeeds in the additional LBT, it may be said that the UE performs the RACH preamble retransmission due to the LBT failure.

4.1.2. Second RACH Preamble Transmission Method

When a UE performs RACH preamble retransmission after failing in LBT for RACH preamble transmission (or when the UE performs the RACH preamble transmission after succeeding in additional LBT), the UE may perform the RAHC preamble retransmission while maintaining the value of RACH preamble transmission power (or the value of a RACH counter) but changing the transmission beam of a RACH preamble. In this case, a pattern for changing the transmission beam may be preconfigured, indicated by separate signaling (e.g., DCI, RRC signaling, etc.), or randomly changed depending on UE implementation.

In particular, this method may be efficient when a UE performs LBT in a specific beam direction in which the UE desires to transmit a RACH preamble but fails in the LBT. According to the method, the UE may avoid a collision with other nodes that transmit signals in the specific beam direction, and thus the LBT success probability may increase.

Alternatively, the method may be applied when a UE fails in performing LBT X times or more. For example, when a UE fails in LBT less than X times, the UE may retransmit a RACH preamble based on the above-described first RACH preamble transmission method. However, if the UE fails in the LBT X times or more, the UE may retransmit the RACH preamble based on the second RACH preamble transmission method.

4.1.3. Third RACH Preamble Transmission Method

When a UE performs RACH preamble retransmission after failing in LBT for RACH preamble transmission (or when the UE performs the RACH preamble transmission after succeeding in additional LBT), the UE may perform the RACH preamble (re)transmission by reducing the value of RACH preamble transmission power or the value of a RACH counter.

This method may be efficient when an energy detection (ED) threshold can be changed dynamically depending on the RACH transmission power.

In the legacy LTE LAA system, the ED threshold value for UL transmission may be determined by PCMAX_H,c, which is configured by higher layer signaling, and the corresponding value is not affected when the actual UL transmission power value is changed.

Thus, if the ED threshold value of LBT for RACH transmission is configured to depend on the actual transmission power value, it is desirable that the ED threshold value decreases as the RACH transmission power increases. Since the amount of interference caused to neighbors may increase as the transmission power increases, the amount of the interference caused to the neighbors during LBT may become more sensitive if the ED threshold value decreases.

If the UE decreases the RACH preamble transmission power due to the LBT failure, RACH reception coverage may also be reduced. In this case, the UE may increase the number of RACH repetitions to compensate for the reduced RACH reception coverage.

Figure 19:
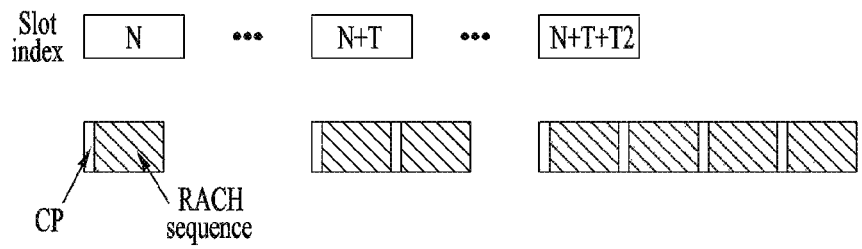
FIG. 19 is a diagram schematically illustrating an example of the third RACH preamble transmission method according to the present disclosure.

FIG. 19 is a diagram schematically illustrating an example of the third RACH preamble transmission method according to the present disclosure.

As shown in FIG. 19, when a UE fails in LBT for RACH transmission in slot #N, the UE may attempt RACH retransmission in slot #N+T (or performs the RACH transmission by attempting additional LBT). In this case, the UE may reduce the transmission power value by 3 dB (or increase the ED threshold value by 3 dB) and then repeatedly transmit a RACH sequence two times. If the UE fails in the LBT in slot #N+T, the UE may further reduce the transmission power value by 3 dB (or further increase the ED threshold value by 3 dB) and then repeatedly transmit the RACH sequence four times.

The above-described RACH transmission method may be applied not only to a structure in which a cyclic prefix (CP) and a RACH sequence are alternately repeated (e.g., structure of CP+sequence+CP+sequence+ . . . ) but to a structure in which a plurality of RACH sequences are located after an initial CP (e.g., a structure of CP+sequence+sequence+ sequence+ . . . ). In addition, a different RACH format or a different RACH resource may be configured depending on the number of times that a sequence is repeated.

Figure 20:
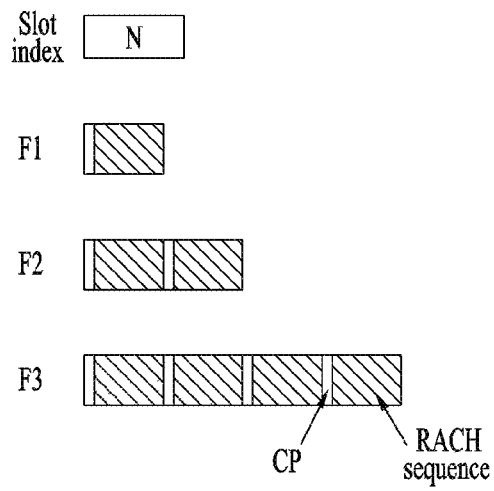
FIG. 20 is a diagram schematically illustrating another example of the third RACH preamble transmission method according to the present disclosure.

FIG. 20 is a diagram schematically illustrating another example of the third RACH preamble transmission method according to the present disclosure.

As shown in FIG. 20, a UE may perform LBT by assuming different transmission power and a different number of times that a RACH sequence is repeated for each carrier or subband in the frequency domain and then perform RACH transmission on the carrier or subband where the UE succeeds in the LBT by applying corresponding transmission power and the number of times that the RACH sequence is repeated.

Specifically, when performing the LBT, the UE may use transmission power P (dBm) and ED threshold E (dBm) corresponding thereto for F1, use transmission power P-3 (dBm) and ED threshold E+3 (dBm) corresponding thereto for F2, and use transmission power P-6 (dBm) and ED threshold E+6 (dBm) corresponding thereto for F3.

If the UE succeeds in multiple LBTs corresponding to different carriers or subbands, the UE may perform the RACH preamble transmission as follows.

(1) The UE selects a RACH preamble with the highest (or lowest) transmission power and then transmits the selected RACH preamble.

(2) The UE transmits RACH preambles using all carriers or subbands where the UE succeeds in the LBT.

(3) The UE transmits a RACH preamble using a randomly selected carrier or subband from among all carriers or subbands where the UE succeeds in the LBT.

The above-described RACH transmission method may be applied not only to a structure in which a CP and a RACH sequence are alternately repeated (e.g., structure of CP+sequence+CP+sequence+ . . . ) but to a structure in which a plurality of RACH sequences are located after an initial CP (e.g., a structure of CP+sequence+sequence+sequence+ . . . ).

Additionally, the third RACH preamble transmission method may be combined to the first or second RACH preamble transmission method.

For example, a UE may perform RACH preamble transmission using the first or third RACH preamble transmission method depending on the number of times that the UE fails in LBT. Specifically, when the number of times that the LBT failure occurs is less than Y, the UE may perform the RACH preamble transmission using the first RACH preamble transmission method. When the number of times that the LBT failure occurs is equal to or more than Y, the UE may perform the RACH preamble transmission using the third RACH preamble transmission method.

As another example, a UE may apply the second RACH preamble transmission method to all beam directions (or a predetermined number of beam directions or more). If the UE fails in all LBT, the UE may apply the third RACH preamble transmission method.

In addition, the third RACH preamble transmission method may be applied to a general RACH preamble transmission method where RACH preamble transmission is not performed based on beam sweeping.

Moreover, the third RACH preamble transmission method may be applied when the ED threshold is configured with respect to a specific semi-static power value (e.g., PCMAX_H,c) instead of being dynamically changed depending on the RACH transmission power.

For example, it is assumed that there is a semi-statically configured ED threshold value, E_semi. In this case, if a UE applies the third RACH preamble transmission method, the UE may perform LBT based on the number of RACH sequence repetitions, that is, by setting the ED threshold value to E_semi+10*$\log_{10}$(the number of RACH sequence repetitions). As a particular example, when a UE applies the third RACH preamble transmission method, the UE may perform LBT by applying $P_{TX}$-10*$\log_{10}$(the number of RACH sequence repetitions) rather than $P_{TX}$ shown in Equation 2 below.

$$X'_{Thres\_max} = \max\left\{ \begin{array}{l} -72 + 10 \cdot \log 10(BW\text{MHz}/20 \text{ MHz})\text{dBm}, \\ \min\left\{ \begin{array}{l} T_{max}, \\ T_{max} - T_A + (P_H + 10 \cdot \\ \log 10(BW\text{MHz}/20 \text{ MHz}) - P_{1X}) \end{array} \right\} \end{array} \right\}$$ [Equation 2]

The method of increasing the ED threshold value when the same signal is repeatedly transmitted may be applied not only to the RACH signal transmission but also when the same signal is (repeatedly) transmitted in multiple slots (or subframes) (by reducing transmission power). For example, when an eNB (or gNB) or a machine type communication (MTC) or Internet of Things (IoT) UE repeatedly transmits a UL or DL signal (in a U-band), the eNB (or gNB) or UE may apply the above-described method when performing LBT to transmit the corresponding UL or DL signal.

4.2. LBT Method for RACH Message Transmission

In the LTE Rel-14 eLAA system to which the present disclosure is applicable, a UE may perform two types of channel access procedures for LBT.

The first type of channel access procedure may correspond to an LBT type where a UE selects a random back-off counter value within a contention window, decreases the counter value by 1 whenever a channel is idle, and then starts signal transmission when the counter value becomes 0.

The second type of channel access procedure may correspond to an LBT type where a UE starts signal transmission when determining that a channel is idle during a predetermined time (e.g., 25 usec).

When an eNB (or gNB) occupies a specific channel by performing LBT, the eNB (or gNB) may use some of the occupied time (e.g., channel occupancy time (COT)) and configure a UE to use the remaining time. In this case, the UE may access to the specific channel by performing LBT according to the second type of channel access procedure rather than the first type of channel access procedure. In other words, when the eNB (or gNB) occupies the channel by performing the LBT according to the first type of channel access procedure that requires a relatively large amount of time, the UE may use the channel by performing the LBT according to the second type of channel access procedure that requires a relatively small amount of time compared to the first type of channel access procedure.

Based on the above features, a description will be given of an LBT method for RACH message transmission at a UE.

4.2.1. First LBT Method

Multiple candidate times (or multiple candidate frequency bands) where a UE can start RACH message transmission may be configured or scheduled by considering UE's LBT failure. This operation may be performed by an eNB (or gNB).

For example, when multiple times where a UE can start msg1 transmission are preconfigured, the UE may start the msg1 transmission from the time when the UE succeeds in LBT among the corresponding times.

Next, the UE may expect to receive msg2 in response to msg1 within a longer time window (or more transmission time intervals (TTIs)) than that of a licensed band. In addition, msg2 may schedule PUSCH resources corresponding to multiple (consecutive) slots as a resource region for msg3. Upon receiving msg2, the UE may perform PUSCH transmission only in one slot in which the UE succeeds in the LBT within the scheduled resource region.

As in the case of msg2, the UE may expect to receive msg4 in response to msg3 within a longer time window (or more TTIs) than that of a licensed band.

Additionally, when multiple candidate times where a UE can start RACH message transmission are configured or scheduled by considering UE's LBT failure, the number of selectable candidates may be configured differently depending on the number of times that RACH preamble retransmission is performed (or the value of a RACH counter). Specifically, the number of selectable candidates may be configured to increase as the number of times that the RACH preamble retransmission is performed (or the RACH counter value) increases.

For example, assuming that candidate times for msg1 transmission are starting boundaries of three consecutive slots, a UE may attempt the msg1 transmission only in one slot randomly selected from three slots. That is, the UE may randomly select one slot from slot #N, slot #N+1, and slot #N+2 and then perform LBT to attempt the transmission in the corresponding slot.

If the UE fails in the corresponding LBT, the UE may attempt the msg1 transmission in two slots randomly selected from three slots to retransmit msg1. That is, the UE may select two slots (e.g., slot #K and slot #K+2) from slot #K, slot #K+1, and slot #K+2. Even if the UE fails in the LBT in slot #K, the UE may attempt the LBT again to perform the preamble transmission in slot #K+2.

In this case, the number of first candidate times for the msg 1 transmission and/or the number of second candidate times, which can be selected depending on the initial transmission and the number of times of retransmission, may be predefined or configured by L1 signaling or higher layer signaling. The configuration of the number of candidate times may be equally applied to msg3.

The method has an advantage in that load balancing can be established between RACH resources.

In addition, the method may be easily applied in the frequency domain other than the time domain. For example, when multiple candidate frequency bands (carriers, sub-bands, or partial bands) where message transmission can be started are configured or scheduled, the number of selectable candidates may be configured differently depending on the number of times that RACH preamble retransmission is performed (or the value of a RACH counter).

4.2.2. Second LBT Method

In LTE Rel-14 eLAA, four priority classes has been defined. In this case, as the priority class increases (as the time during which LBT is performed increases), the COT occupied by a UE may increase.

The above configuration may be applied when a UE occupies a channel using the first channel access procedure.

For example, when a UE performs LBT according to the first channel access procedure to transmit msg1, the length of the COT occupied by the UE may vary depending on the priority class corresponding to the LBT performed by the UE.

Specifically, when the UE performs the first channel access procedure corresponding to priority class 1/2/3/4, the UE may occupy the maximum 2/3/8/8 or 2/3/6/6 ms COT. In this case, if the UE transmits information on the occupiable COT to an eNB (or gNB), the eNB (or gNB) may transmit a DL signal by performing the second channel access procedure for msg2 transmission during the time equivalent to the corresponding COT.

In this case, a RACH sequence or a RACH (time and/or frequency) resource to be used by the UE may be configured differently depending on the COT length.

As another example, when transmitting msg3, the UE may transmit the information on the occupiable COT to the eNB or (gNB). That is, the UE may configure a different PUSCH transmission resource (in the time and/or frequency domain) or a different DMRS sequence depending on the COT length in order to transmit the information on the occupiable COT to the eNB (or gNB). Alternatively, the UE may transmit information on the COT length to the eNB (or gNB) on a UL-SCH or via a medium access control (MAC) control element (CE).

4.2.3. Third LBT Method

In LTE Rel-14 eLAA, an eNB may inform a UE of the duration of UL subframes on a (common) PDCCH. Thus, the UE may not expect DL reception in the corresponding duration.

Similarly, an eNB (or gNB) may inform a UE of the duration of UL subframes (or slots) in the LTE or NR system to which the present disclosure is applicable. In this case, reception of msg2 or msg4 in the corresponding duration may be exceptionally allowed.

For example, when the eNB (or gNB) indicates subframes from SF #N+K to SF #N+K+J+V shown in FIG. 18 as UL subframes, the UE may not expect to receive a DL channel (or DL signal) in the corresponding duration. However, if the UE transmits msg1, the UE may expect to receive only msg2 within the corresponding duration.

4.2.4. Fourth LBT Method

When a UE attempts preamble retransmission due to failure in LBT for RACH preamble transmission, the UE may perform an LBT procedure with a higher success probability than that of the previous LBT procedure.

For example, an ED threshold applied to the LBT for the preamble retransmission may be set higher than that applied to the LBT for the initial preamble transmission.

As another example, the size of a contention window applied to the LBT for the preamble retransmission may be set smaller than that applied to the LBT for the initial preamble transmission.

As a further example, the length of defer duration applied to the LBT for the preamble retransmission may be set shorter than that applied to the LBT for the initial LBT transmission. In this case, the defer duration may mean the length of a minimum idle slot for reducing a counter value whenever one idle slot, which is applied at the beginning of an LBT procedure, or a corresponding channel is busy. The defer duration may be determined as 16 usec+9 usec*Z, where the value of Z depends on priority classes. In particular, the value of Z for the preamble retransmission may be set lower than that for the initial transmission.

Figure 21:
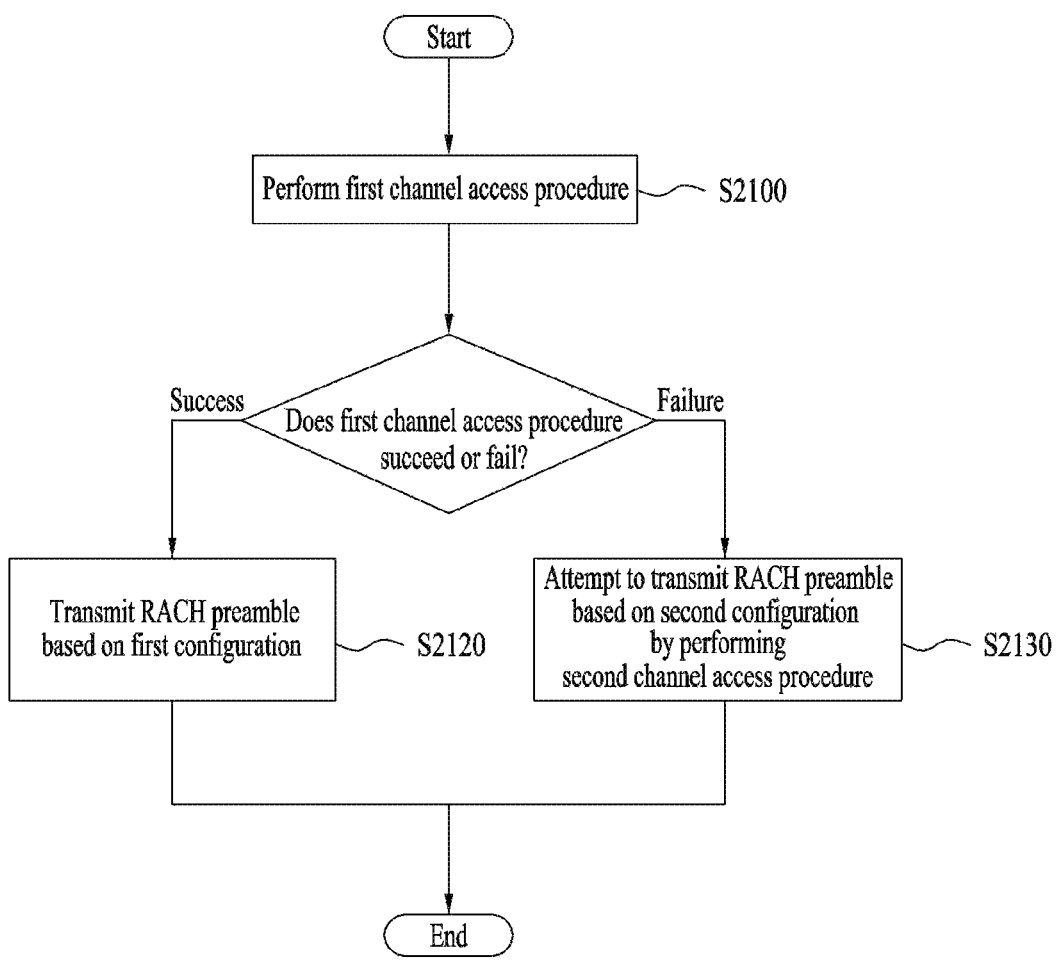
FIG. 21 is a flow chart schematically illustrating a UE's random access procedure in a unlicensed band according to the present disclosure.

FIG. 21 is a flow chart schematically illustrating a UE's random access procedure in a U-band according to the present disclosure.

First, a UE performs a first channel access procedure for transmitting a RACH preamble in the U-band during a first time unit (S2110).

As described above, since the U-band (unlicensed band) can be used by various transmission and reception nodes unlike a licensed band, the UE should perform a channel access procedure to use the U-band.

When the first channel access procedure succeeds, the UE transmits the RACH preamble based on a first configuration during the first time unit (S2120).

On the contrary, when the first channel access procedure fails, the UE performs a second channel access procedure for transmitting the RACH preamble in the U-band during a second time unit and attempts to transmit the RACH preamble based on a second configuration (S2130). In other words, when the first channel access procedure fails, the UE performs the second channel access procedure for transmitting the RACH preamble in the U-band during the second time unit and transmits the RACH preamble based on the second configuration during the second time unit depending on whether the second channel access procedure succeeds.

When the UE succeeds in one of the first and second channel access procedures, the UE may transmit information on a COT that can be occupied by the UE to a BS.

Depending on embodiments, the first and second configurations may be configured as follows.

For example, a first transmission power configuration and a first beam configuration included in the first configuration may be set to be equal to a second transmission power configuration and a second beam configuration included in the second configuration, respectively. In other words, when the UE attempts to transmit the RACH preamble by performing a new channel access procedure (e.g., the second channel access procedure) due to failure in a previous channel access procedure (e.g., the first channel access procedure), the UE may perform new RACH preamble transmission based on the second configuration equal to the first configuration used for previous RACH preamble transmission.

As another example, when a predetermined number or more of channel access procedures including the first channel access procedure fail before the second access procedure is performed, the first beam configuration included in the first configuration may be set to be different from the second beam configuration included in the second configuration. In other words, when the UE attempts to transmit the RACH preamble by performing a new channel access procedure (e.g., the second channel access procedure) after failing in a predetermined number or more of channel access procedures including a previous channel access procedure (e.g., the first channel access procedure), the UE may perform new RACH preamble transmission in a beam direction different from that used for previous RACH preamble transmission.

In this case, the first and second channel access procedures may be performed based on the first and second beam configurations, respectively. In other words, the UE may perform each of the first and second channel access procedures in a direction for corresponding RACH preamble transmission.

As a further example, the transmission power value in the first transmission power configuration included in the first configuration may be set to be higher than that in the second transmission power configuration included in the second configuration. The ED threshold value in a first ED threshold configuration included in the first configuration may be set to be lower than that in a second ED threshold configuration included in the second configuration. The number of repetitions in a first RACH repetition configuration included in the first configuration may be set to be lower than that in a second RACH repetition configuration included in the second configuration. In other words, when the UE attempts to transmit the RACH preamble by performing a new channel access procedure (e.g., the second channel access procedure) due to failure in a previous channel access procedure (e.g., the first channel access procedure), the UE may perform new RACH preamble transmission using a transmission power value lower than that of previous RACH preamble transmission, an ED threshold value higher than that of the previous RACH preamble transmission, and the number of repetitions higher than that of the previous RACH preamble transmission.

When the first and second time units are included within a COT occupied by the BS, each of the first and second channel access procedures may correspond to a channel access procedure for determining whether a channel is idle during a predetermined time for the U-band. In other words, when the first and second time units are included within the COT occupied by the BS, the UE may attempt and perform the RACH transmission using a channel access procedure with a short time period Each of the first and second time units may correspond to one of candidate time units preconfigured by the BS.

The UE may expect to receive a response message for the RACH preamble within a predetermined time window from the time when the RACH preamble is transmitted. In this case, the predetermined time window may be set to be longer than a time window for the RACH preamble configured for a licensed band.

The response message may correspond to an RAR message supported in the NR system.

In the NR system to which the present disclosure is applicable, the first and second time units may correspond to first and second slots, respectively.

Since each of the examples of the proposed methods may be included as one method for implementing the present disclosure, it is apparent that each example can be regarded as a proposed method. In addition, although the proposed methods can be implemented independently, some of the proposed methods can be combined (or merged) for implementation. Moreover, it may be regulated that information on whether the proposed methods are applied (or information on rules related to the proposed methods) should be transmitted from a BS to a UE through a predefined signal (e.g., a physical layer signal, a higher layer signal, etc.).

5. Device Configuration

Figure 22:
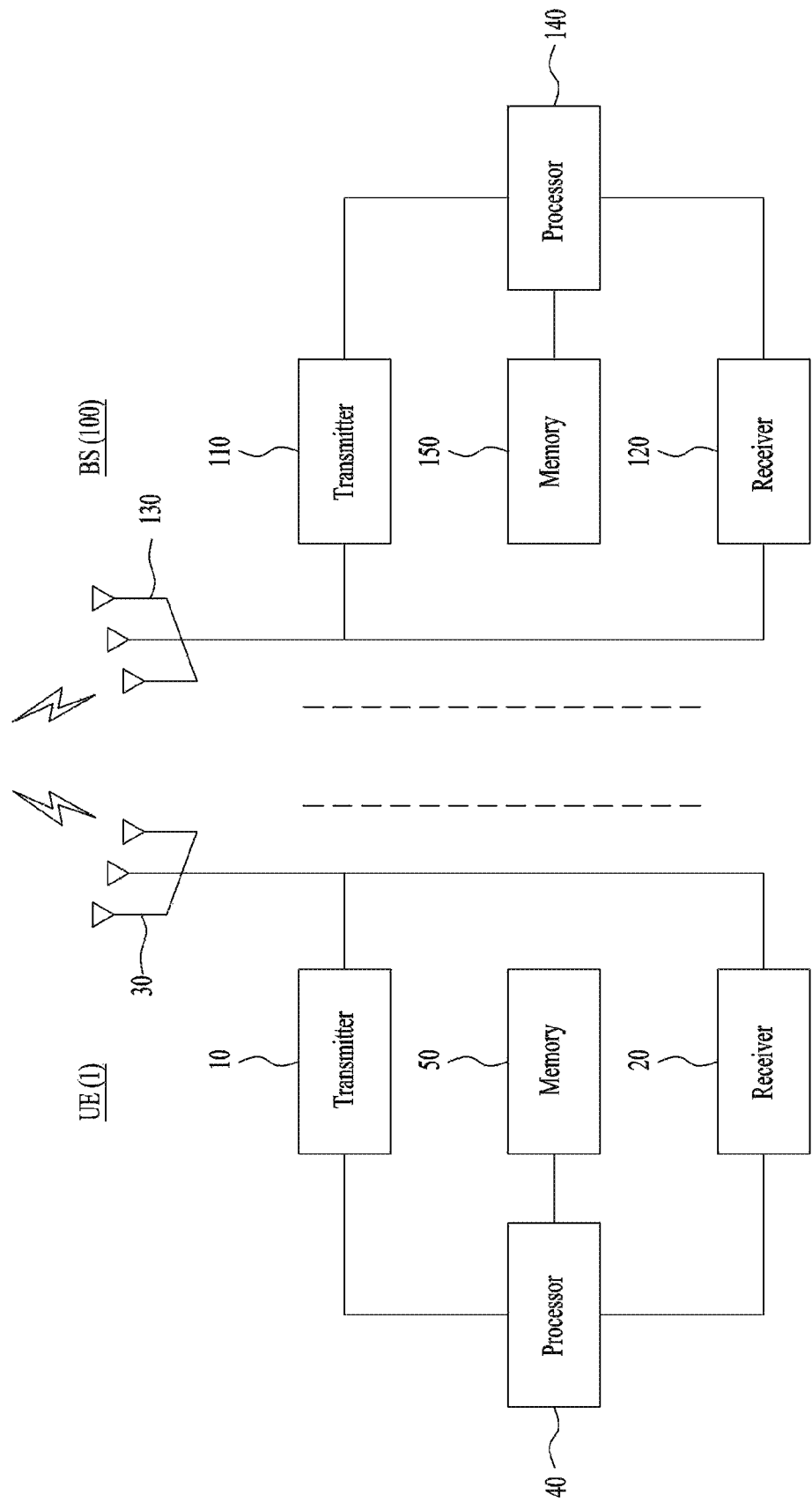
FIG. 22 is a diagram illustrating the configurations of a UE and a BS for implementing the proposed embodiments.

FIG. 22 is a diagram illustrating the configurations of a UE and a BS for implementing the proposed embodiments. The UE and the BS illustrated in FIG. 22 may operate to implement the embodiments of a random access procedure in a U-band.

The UE 1 may act as a transmission end in UL and a reception end in DL. The BS (eNB or new generation NodeB (gNB)) 100 may act as a reception end in UL and a transmission end in DL.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure and a memory 50/150 for temporarily or permanently storing operations of the processor 40/140.

With the above configuration, the UE 1 performs a first channel access procedure for transmitting a RACH preamble in a U-band during a first time unit using the processor 40 configured to control the transmitter 10 and the receiver 20. Next, when the first channel access procedure succeeds, the UE 1 transmits the RACH preamble based on a first configuration during the first time unit using the processor 40 configured to control the transmitter 10 and the receiver 20. On the contrary, when the first channel access procedure fails, the UE 1 performs a second channel access procedure for transmitting the RACH preamble in the unlicensed band during a second time unit and transmits the RACH preamble based on a second configuration during the second time unit depending on whether the second channel access procedure succeeds, using the processor 40 configured to control the transmitter 10 and the receiver 20.

The transmitter and receiver of each of the UE and BS may perform packet modulation/demodulation for data transmission, high-speed packet channel coding, OFDMA packet scheduling, TDD packet scheduling, and/or channel multiplexing. Each of the UE and BS of FIG. 22 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of performing a random access procedure by a user equipment (UE) in a wireless communication system supporting an unlicensed band, the method comprising:
    performing a first channel access procedure for transmitting a random access channel (RACH) preamble in the unlicensed band during a first time unit;
    when the first channel access procedure succeeds, transmitting the RACH preamble based on a first configuration during the first time unit; and
    when the first channel access procedure fails, performing a second channel access procedure for transmitting the RACH preamble in the unlicensed band during a second time unit and transmitting the RACH preamble based on a second configuration during the second time unit depending on whether the second channel access procedure succeeds.

2. The method of claim 1, wherein a first transmission power configuration and a first beam configuration included in the first configuration are set to be equal to a second transmission power configuration and a second beam configuration included in the second configuration, respectively.

3. The method of claim 1, wherein when a predetermined number or more of channel access procedures including the first channel access procedure fail before the second access procedure is performed, a first beam configuration included in the first configuration is set to be different from a second beam configuration included in the second configuration.

4. The method of claim 3, wherein the first and second channel access procedures are performed based on the first and second beam configurations, respectively.

5. The method of claim 1, wherein a transmission power value in a first transmission power configuration included in the first configuration is set to be higher than that in a second transmission power configuration included in the second configuration,
    wherein an energy detection (ED) threshold value in a first ED threshold configuration included in the first configuration is set to be lower than that in a second ED threshold configuration included in the second configuration, and
    wherein the number of repetitions in a first RACH repetition configuration included in the first configuration is set to be lower than that in a second RACH repetition configuration included in the second configuration.

6. The method of claim 1, wherein when the first and second time units are included within a channel occupancy time (COT) occupied by a base station, each of the first and second channel access procedures corresponds to a channel access procedure for determining whether a channel is idle during a predetermined time for the unlicensed band.

7. The method of claim 6, wherein the first and second time units are preconfigured by the base station.

8. The method of claim 6, wherein the UE expects to receive a response message for the RACH preamble within a predetermined time window from a time when the RACH preamble is transmitted.

9. The method of claim 8, wherein the predetermined time window is set to be longer than a time window for the RACH preamble configured for a licensed band.

10. The method of claim 8, wherein the response message corresponds to a random access response (RAR) message.

11. The method of claim 1, further comprising, when the UE succeeds in one of the first and second channel access procedures, transmitting information on a channel occupancy time (COT) occupiable by the UE to a base station.

12. The method of claim 1, wherein the first and second time units correspond to first and second slots, respectively.

13. A user equipment (UE) for performing a random access procedure in a wireless communication system supporting an unlicensed band, the UE comprising:

a transmitter;
a receiver; and
a processor connected to the transmitter and the receiver,
wherein the processor is configured to:
perform a first channel access procedure for transmitting a random access channel (RACH) preamble in the unlicensed band during a first time unit;
when the first channel access procedure succeeds, transmit the RACH preamble based on a first configuration during the first time unit; and
when the first channel access procedure fails, perform a second channel access procedure for transmitting the RACH preamble in the unlicensed band during a second time unit and transmit the RACH preamble based on a second configuration during the second time unit depending on whether the second channel access procedure succeeds.

14. The UE of claim 13, wherein the UE communicates with at least one of a mobile terminal, a network and an autonomous vehicle.

* * * * *